United States Patent [19]

Tezuka et al.

[11] Patent Number: 4,548,259

[45] Date of Patent: Oct. 22, 1985

[54] LIQUID CONTAINING VESSEL WITH TEMPERATURE CONTROL DEVICE

[75] Inventors: Sadao Tezuka, Tokyo; Yasuhiko Tanaka, Yono; Kunihiko Matsumura, Tokyo; Tadao Yamamoto, Machida; Nobuyoshi Suzuki, Hachioji; Toshio Tsurukawa, Machida, all of Japan

[73] Assignee: Olympus Optical Co., Ltd., Tokyo, Japan

[21] Appl. No.: 433,263

[22] Filed: Oct. 7, 1982

[30] Foreign Application Priority Data

Oct. 9, 1981 [JP] Japan .................. 56-160314
Oct. 9, 1981 [JP] Japan .................. 56-160315
Oct. 9, 1981 [JP] Japan .................. 56-160316

[51] Int. Cl.$^4$ .................. F25B 29/00; F25B 21/02
[52] U.S. Cl. .................. 165/14; 62/3; 165/27; 165/30; 165/63; 356/246; 374/11; 165/11.1
[58] Field of Search .................. 356/246; 62/3; 374/11, 374/33, 17, 20, 34, 12, 13; 165/61, 62, 63, 64, 27, 30, 11 R

[56] References Cited

U.S. PATENT DOCUMENTS

| | | | |
|---|---|---|---|
| 3,035,109 | 5/1962 | Sheckler | 62/3 X |
| 3,314,288 | 4/1967 | Sherwin | 374/13 |
| 4,031,740 | 6/1977 | Achermann | 374/11 X |
| 4,089,184 | 5/1978 | Beitner | 62/3 |
| 4,310,047 | 1/1982 | Branson | 62/3 X |
| 4,407,133 | 10/1983 | Edmonson | 62/3 |

FOREIGN PATENT DOCUMENTS

| | | | |
|---|---|---|---|
| 2651356 | 5/1978 | Fed. Rep. of Germany | |
| 1351990 | 12/1963 | France | 62/3 |
| 2425885 | 1/1980 | France | 62/3 |
| 2502332 | 9/1982 | France | 356/246 |

*Primary Examiner*—Douglas Hart
*Attorney, Agent, or Firm*—Parkhurst & Oliff

[57] ABSTRACT

A flowcell for containing sample solutions is surrounded by an electric heater which is then surrounded by an isothermal frame having a large heat capacity, and a Peltier element serving as a cooling source is coupled with the isothermal frame. A heat delaying plate is arranged between the flowcell and heater and a temperature sensor is arranged between the flowcell and the heat delaying plate. The Peltier element is controlled in such a manner that the temperature of the isothermal frame is maintained substantially at a constant temperature lower than a predetermined temperature at which the sample solution is to be kept. The heater is controlled in accordance with a difference between the temperature of the sample solution and the predetermined temperature.

26 Claims, 20 Drawing Figures

FIG_3

FIG_4A

FIG_4B

FIG_12

LIQUID CONTAINING VESSEL WITH TEMPERATURE CONTROL DEVICE

BACKGROUND OF THE INVENTION

The present invention relates generally to a technique for controlling the temperature of liquids contained in a vessel for use in a chemical analyzer wherein sample liquids such as blood are photometered colorimetrically, and particularly to a flowcell type vessel with a temperature control device.

For example, in the case of using a flowcell for colorimetric photometry, sample solutions contained in reaction vessels are supplied successively to the flowcell, and a given photometry is performed for the sample solution contained in the flowcell. In this case, in order to test successive samples, sample solutions whose amount is at least sufficient to fill the flowcell are supplied successively to the flowcell while being separated by air from each other. When a sample solution is supplied to the flowcell, the solution is maintained at a predetermined temperature for a given time period by abruptly heating or cooling the solution. Recently, chemical analyzer with high processing efficiency have been made which can treat a very large number of the sample solutions within a short time period. Therefore, in the flowcell, the sample solution must be heated or cooled to the predetermined temperature within a short time period. In addition, the recent chemical analyzers are so contructed as to minimize the sample amount and reagent amount to be used therein as mcuh as possible, and thus the flowcells have been made smaller correspondingly smaller. Therefore, it also is necessary to make the temperature control apparatus in the flowcell and the chemical analyzer small.

Heretofore, proposed method for controlling the temperature of the sample solution in the flowcell has been to use a thermostat, i.e., providing an isothermal liquid tank for the flowcell having a heating and cooling means. In the case of using the isothermal liquid tank, the reaction vessel is placed in a thermo-medium such as water or ethylene glycol, and the sample solution is maintained at a predetermined temperature by controlling the temperature of the thermo-medium. However, in this case, the capacity of the thermo-medium must be several hundred to thousands of times as large as that of the flowcell, and thus the whole system is extremely large in size. It is also necessary to use a large control apparatus to control the temperature of a thermo-medium having such a large capacity, and thus the system becomes expensive. Moreover, when changing or presetting a predetermined temperature, an extremely long time is required until the temperature of thermo-medium reaches the desired temperature, because the thermal capacity of the isothermal liquid tank is extremely large. This means that it takes a very long time for the thermal-medium to reach an equilibrium state when a temperature variation occurs, and that the response characteristics and thus the controlling accuracy of the apparatus become worse.

Figure 1A:
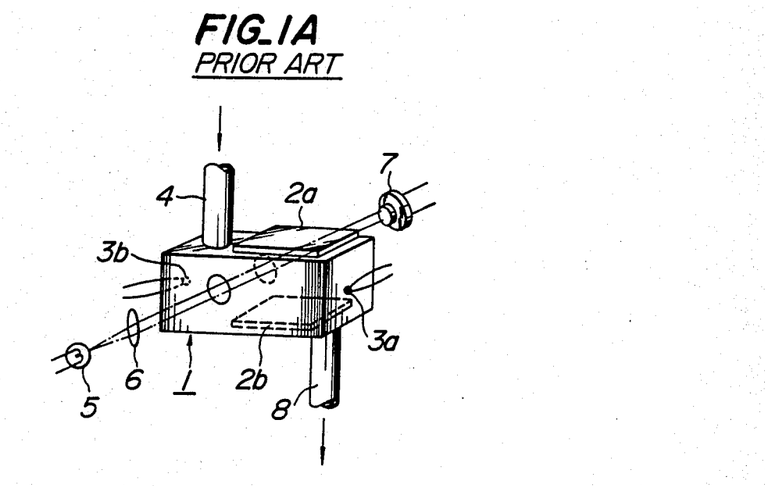
FIGS. 1A and 1B are perspective views showing conventional flowcells using a Peltier element as a heating and cooling means.
Figure 1B:
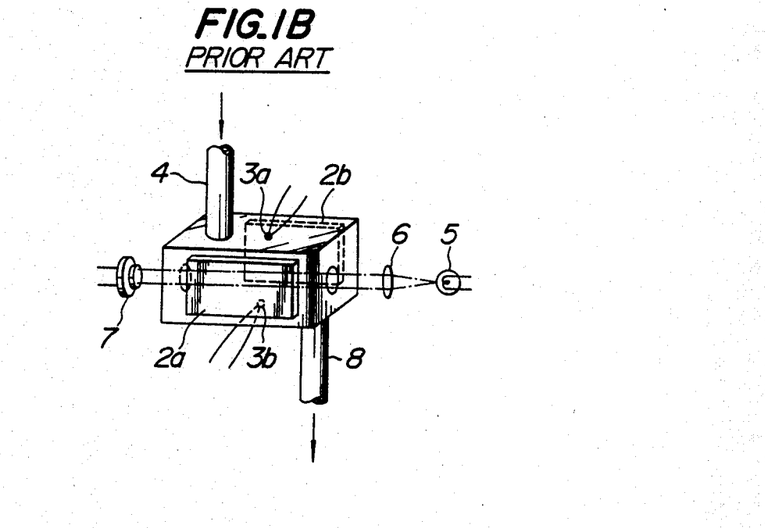

In order to eliminate the drawbacks mentioned above, there has been proposed in German Patent specification No. 2651356 a vessel shown in FIGS. 1A and 1B. In FIGS. 1A and 1B, a pair of thermo-modules $2a$, $2b$ made of, for example, a Peltier element are arranged on upper and lower surfaces (FIG. 1A) or opposed side surfaces (FIG. 1B) of a flowcell 1 and a pair of temperature sensors $3a$, $3b$ are arranged on side surfaces (FIG. 1A) or upper and lower surfaces (FIG. 1B). A sample solution is supplied to the flowcell 1 through a supplying tube 4, and the sample solution contained in the flowcell 1 is maintained at a predetermined temperature by heating or cooling the thermo-modules $2a$, $2b$ in accordance the output signals from the temperature sensors $3a$, $3b$. A light flux emitted from a light source 5 is made incident upon a light receiving element 7 through a collimator lens 6 and the flowcell 1 so as to effect a colorimetric photometry, and, after the photometry, the sample solution is discharged out of the flowcell through a discharging tube 8. When Peltier elements are used for the thermo-modules $2a$, $2b$, it is possible to perform the heating or the cooling selectively by changing the polarity of the electric current supplied therein. However, it then is necessary to use a power supply having both positive and negative polarities, and thus the system becomes complex in construction and expensive. Moreover, when the heating mode is changed into the cooling mode or vice versa, a dead zone is produced when no current is supplied to the elements $2a$, $2b$. During this dead zone, if any disturbance occurs, the temperature stability will be affected to a great extent. In addition, in the dead zone, the thermal response and thus the controlling accuracy become worse. Further, if the process of supplying a sample solution into the flowcell and then discharging the solution out of the flowcell is repeated several tens or several hundreds of times in accordance with a given time sequence, the thermal capacity of the flowcell is increased and the difference between the predetermined temperature and the temperature in the flowcell gradually becomes large, so that a temperature off-set is produced.

As mentioned above, it is extremely difficult to quickly set the solution sample successively supplied into the flowcell at the predetermined temperature and to maintain this condition for the desired time period, and thus it is necessary to solve several difficult problems. For example, for each of the respective solution sample, the following very severe requirement might have to be satisfied: the predetermined temperature must be maintained within 37° C.±0.2° C. for ten seconds while the sample is disturbed briefly twice, the surrounding temperature is varied from 18° C. to 28° C., and the power supply voltage has a fluctuation of about 10%. In addition, it is necessary to make the whole apparatus small and inexpensive.

SUMMARY OF THE INVENTION

The purpose of the present invention is to eliminate the drawbacks mentioned above and to provide a vessel with a temperature control device which can satisfy the various conditions mentioned above.

According to the invention, a vessel for containing a liquid to be used in a chemical analysis and for maintaining the liquid at a predetermined temperature comprises means for containing the liquid;

means arranged outside the containing means for heating the liquid;

means arranged outside said heating means for cooling the liquid; and means for detecting the temperature of the liquid.

Another object of the invention is to provide a method for controlling the temperature in the vessel which also can satisfy the various conditions mentioned above.

According to the invention, a method for controlling the temperature of a liquid contained in a vessel having a container for containing the liquid, a heating source for heating the liquid, a cooling source for cooling the liquid and a sensor for detecting a temperature of the liquid, comprises comparing the output signal of the temperature sensor with a reference signal corresponding to a predetermined temperature at which the liquid is to be maintained to derive a difference signal;

supplying said difference signal to a proportional, differential and integral control circuit to derive a control signal; and controlling said heating source in accordance with the control signal.

The invention also relates to an apparatus for controlling the temperature of a vessel and to provide a novel and useful apparatus for maintaining a liquid contained in the vessel at a predetermined temperature in an accurate and prompt manner.

According to the invention, an apparatus is provided for controlling the temperature of a vessel containing a liquid to be chemically analyzed, said vessel including a container for containing the liquid, a heating source arranged to surround the container for heating the liquid, a cooling source arranged to surround the heating source for cooling the liquid and a sensor for detecting the temperature of the liquid, comprises means for receiving an output signal from the sensor to derive a difference signal representing a difference between the temperature of the liquid and a predetermined temperature at which the liquid is to be maintained;

means for receiving said difference signal to produce a control signal; and means for controlling the heating source in accordance with the control signal.

DESCRIPTION OF THE PREFERRED EMBODIMENTS

Figure 2:
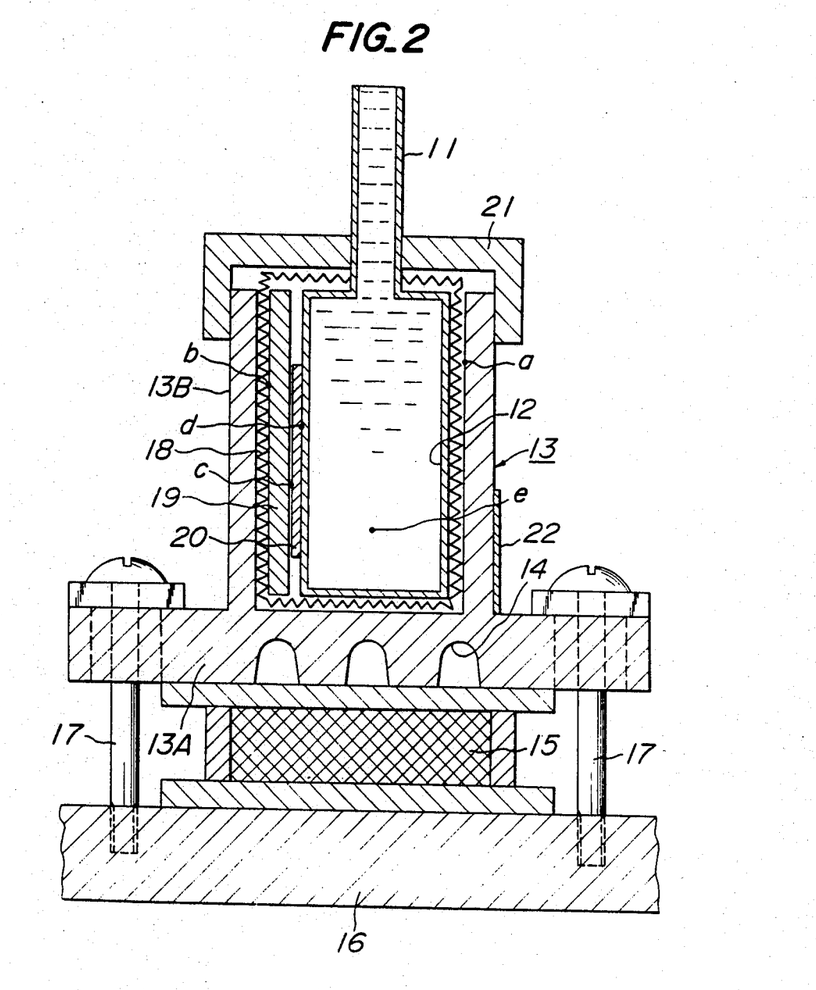
FIG. 2 is a cross sectional view illustrating one embodiment of a vessel according to the invention.

FIG. 2 is a cross sectional view showing one embodiment of a vessel with a temperature control apparatus according to the invention. In the embodiment shown in FIG. 2, a flowcell 12 in which a sample solution is supplied through a pair of tubes (in FIG. 2 only one tube is shown) is surrounded with an isothermal frame 13 comprising a heat sink. The flowcell forms a main container of the vessel. In a bottom surface 13A of the frame 13 are formed a plurality of recesses 14 each of which is filled with material having a low thermal conductivity. In this embodiment, the recesses are filled with air. Under the bottom surface 13A is arranged a Peltier element 15 which serves as a cooling means, with the high temperature side of this Peltier element 15 connected to a radiator plate 16. The radiator plate 16 is also used as a member for supporting the whole vessel, and the isothermal frame 13 is secured to the radiator plate 16 by means of screws 17. The screw 17 is made,, for example, of heat insulating material such as Derlin (trade name of acetals). A side wall 13B of the isothermal frame 13 functions in cooperation with the bottom surface 13A to isolate a space from the ambient atmosphere, and in this space is arranged a heater 18 which surrounds the flowcell 12. A heat delaying plate 19 and a plate-shaped temperature sensor 20 are arranged in a space between one side wall of the flowcell 12 and the heater 18. An upper opening of the isothermal frame 13 may be closed by a cover 21. Further, an auxiliary temperature sensor 22 is secured to an outer surface of the isothermal frame 13.

As mentioned above, since the Peltier element 15 is connected to the bottom surface 13A of the isothermal frame 13, thermal conduction from an upper portion of the frame 13 is delayed as compared with that from a bottom surface, and thus a temperature difference therebetween can occur easily. To avoid this, in this embodiment, the recesses 14 filled with the material having the low thermal conductivity are formed in the bottom surface 13A as a thermal resistance so as to control the flow of heat, and thus the temperature at various portions of the whole isothermal frame 13 is maintained equally. Moreover, the heat capacity of the cover 21 is made larger so as to function as an auxiliary cooling means. In this manner, the isothermal frame 13 and the cover 21 which surround the flowcell 12 are cooled uniformly by means of the Peltier element 15. In addition, the power supply to the Peltier element 15 is controlled in response to an output signal detected by the auxiliary temperature sensor 22 so as to maintain the temperature of the frame 13 at a sufficiently lower temperature than the predetermined temperature of, for example, 37° C.

The temperature sensor 20 is used for detecting the temperature of the sample solution contained in the flowcell 12. It is a matter of course that the temperature of the solution could be measured accurately by providing the sensor directly within the sample solution. However, it is preferable not to arrange the sensor in the flowcell in order to eliminate contamination between successive sample solutions and to improve durability of the flowcell. However, by arranging the sensor outside the flowcell, a problem arises as to how the temperature of the sample solution contained in the flowcell may be detected accurately. Therefore, in this embodiment, the sensor 20 is arranged immediately outside the flowcell 12, and the heat delaying plate 19 which functions as the thermal resistance is arranged between the sensor 20 and the heater 18. In this embodiment, the thermal time constant determined by the thermal resistance and the heat capacity of the heat delaying plate 19 are set at about the same levels as those of the flowcell 12 filled with the sample solution, and thus it is possible to detect accurately the temperature of the sample solution contained in the flowcell by means of the temperature sensor 20 arranged outside the flowcell 12. Further, it is possible to adjust the operational characteristics of the whole control system by changing the characteristics of the heat delaying plate 19 as described hereinbelow.

The temperature sensor 20 is formed by binding with epoxy resin a trimmed thin film of a pure metal of Ni, Pt, etc. Since such a thin film temperature sensor 20 has a low resistance such as several thousand $\Omega$ and a small heat capacity, a fast response can be achieved. The heater 18 comprises a wire-wound heater in which a resistant wire is wound around an insulating plate. In this embodiment, the time constant for heat transmission of the heat delaying plate 19 is set in such a manner that the time delay of a heat flow from the isothermal frame 13 and the heater 18 to the temperature sensor 20 is a little longer than that of the same heat flow transferred into the flowcell 12 containing the sample solution. That is to say, the thermal time constant of the heat delaying plate 19 is a little larger than that of the flowcell 12 filled with the liquid. The heat delaying plate 19 is made of refractory material such as a glass epoxy resin, and its thermal time constant determined by the product of its heat capacity and its thermal resistance thereof is selected in the aforementioned manner. Therefore, it is possible to make the whole vessel small in size by suitably selecting the quality and thickness of the heat delaying plate 19.

As explained above, in the vessel according to the invention, the flowcell 12 is surrounded by the heater 18 and the heater 18 is further surrounded by the isothermal frame 13. In addition, the cooling means 15 such as the Peltier element is arranged in touch with the isothermal frame 13 so as to maintain the isothermal frame 13 at a temperature of, for example, 20° C. lower than the desired predetermined temperature of, for instance, 37° C. That is to say, the cooling means 15 functions as a heat bias to deviate the temperature of the sample solution contained in the flowcell toward a lower side. In this manner, while the flowcell 12 is biased toward the lower side, the temperature detected by the temperature sensor 20 is compared with the predetermined temperature to derive a difference therebetween. Therefore, it is possible to maintain accurately the sample solution contained in the flowcell at the predetermined temperature within a vey short time by controlling the power supply to the heater 18 in accordance with the detected temperature deviation. That is to say, the control characteristics of the system can be improved significantly by effecting cooling and heating at the same time.

Figure 3:
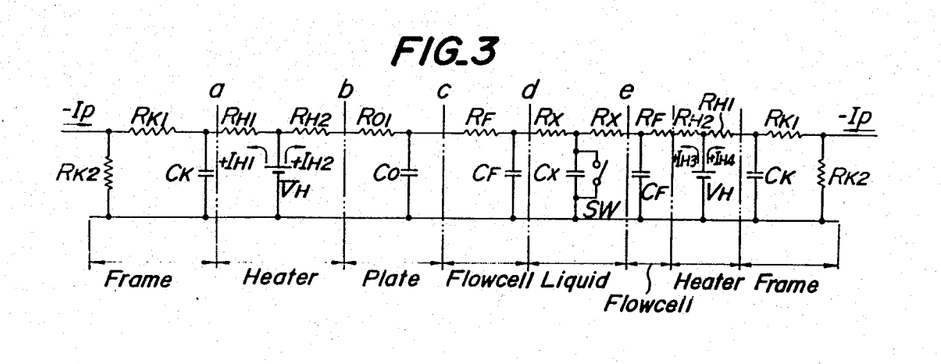
FIG. 3 is a thermo-equivalent circuit representative of the embodiment shown in FIG. 2.

FIG. 3 is a schematic of a thermo-equivalent circuit representing the entire vessel illustrated in FIG. 2. In the circuit shown in FIG. 3, the respective elements of the circuit correspond to portions of the vessel as follows.

$R_{K1}$, $R_{K2}$ ... thermal resistance of isothermal frame 13
$C_K$ ... heat capacity of isothermal frame 13
$R_{H1}$, $R_{H2}$ ... thermal resistance of heater 18
$V_H$ ... heat amount emitted from heater 18
$R_{01}$ ... thermal resistance of heat delaying plate 19
$C_0$ ... heat capacity of heat delaying plate 19
$R_F$ ... thermal resistance of the wall of flowcell 12
$C_F$ ... heat capacity of the wall of flowcell 12
$R_X$ ... thermal resistance of sample solution
$C_X$ ... heat capacity of sample solution
$-I_P$ ... heat flow due to Peltier element 15
$+I_{H1} \sim +I_{H4}$ ... heat flow due to heater 18
SW ... switch for indicating supply or discharge of the sample solution with respect to flowcell 12

Further, points a~e of the thermo-equivalent circuit correspond respectively to those shown in FIG. 2. Moreover, in the thermo-equivalent circuit, the thermal resistance and the heat capacity of the temperature sensor 20 can be negligible, because they are very small. The sensor 20 is arranged at the point c. In case of comparing the right and left sides of the point c, the flowcell in which the sample solution is contained is arranged in the right side. Therefore, if the heat delaying plate 19 having the same thermal resistance and heat capacity as the flowcell and the sample solution is arranged between the heater 18 and the temperature sensor 20, the temperature sensor 20 is considered to be positioned at the center of the whole vessel equivalently, and thus the temperature of the sample solution contained in the flowcell 12 can be detected accurately by means of the sensor 20 arranged outside the flowcell.

Figure 4A:
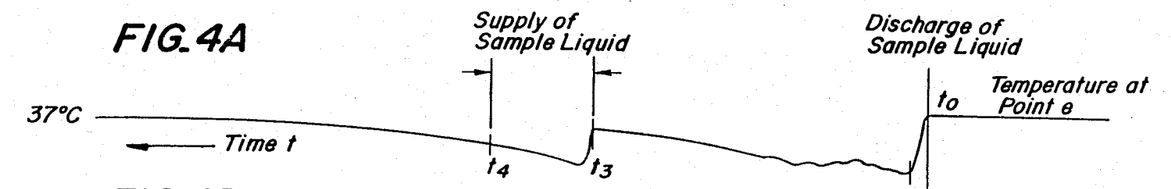
FIGS. 4A and 4B are graphs showing temperature variations of a flowcell and a temperature sensor, respectively.
Figure 4B:
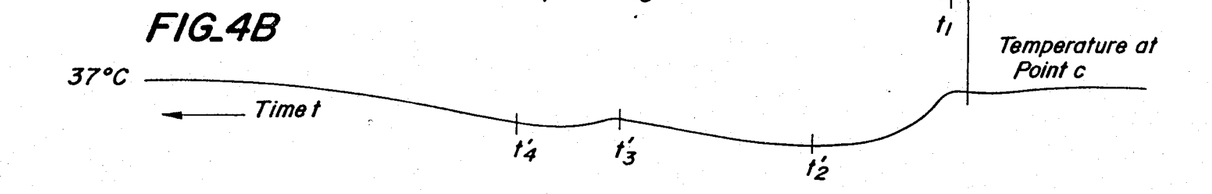

FIGS. 4A and 4B are graphs showing temperature variations of the flowcell and the temperature sensor 20, respectively. In FIGS. 4A and 4B, the temperature variations at the point e in the flowcell 12 and the point c detected by the temperature sensor 20 are shown from a time $t_0$ when a sample solution is discharged from the flowcell 12 through the tube 11 and a next sample solution is supplied into the flowcell, to a time when the sample solution is maintained at the predetermined temperature in the flowcell 12. While the sample solution contained in the flowcell 12 is maintained at the predetermined temperature of 37° C., the points e and c are also maintained substantially at the predetermined temperature. If the discharge of the sample solution contained in the flowcell is started at the instant $t_0$, the temperature at the point e is abruptly decreased. Contrary to this, the temperature at the point c is decreased in a relatively gradual manner. When the temperature decrease at the point c is detected, the control circuit is actuated to supply an electric current to the heater 18, and thus the temperature of the vessel begins to increase. Therefore, the temperature at the point e in the flowcell begins to increase from an instant $t_1$. On the contrary, since there is the heat delaying plate 19 between the heater 18 and the temperature sensor 20, the temperature increase at the point c does not start till an instant $t_2'$, and thus the temperature at the point c begins to increase from the instant $t_2'$. At an instant $t_3$, the next sample solution is supplied to the flowcell 12, and thus the temperature at the point e is abruptly decreased again, because the temperature of the next sample solution is generally lower than the predetermined temperature. The delivery of sample solution into the vessel is continued to an instant $t_4$. During the time period from the instant $t_3$ to be $t_4$, the electric current is continuously supplied to the heater 18, and thus the temperatures at the points e and c are maintained at the desired predetermined temperature of 37° C. after a short time. In this manner, since a cycle mentioned above is repeated with respect to successive sample solutions, the successive sample solutions can be maintained accurately at the predetermined temperature within a short time. It should be noted that an environmental temperature is set at 24° C.

In the embodiment mentioned above, since the thermal time constant of the heat delaying plate 19 is a little larger than that of the flowcell 12 filled with the sample solution, the following effects can be obtained.

Figure 5:
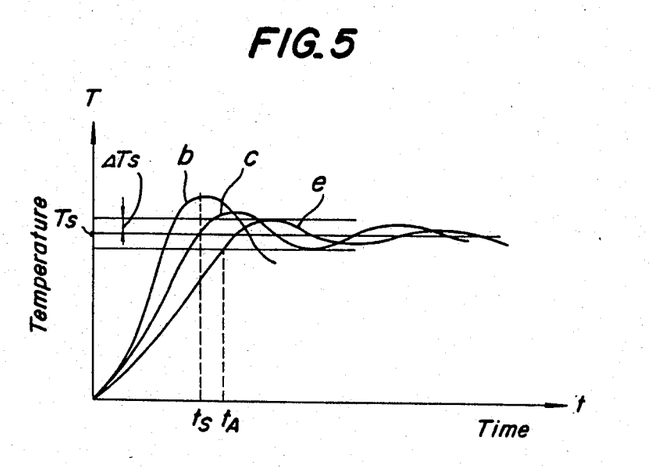
FIGS. 5 and 6 are graphs illustrating a temperature overshoot when the thermal time constant of a heat delaying plate is set larger and smaller than that of the flowcell, respectively.

FIG. 5 is a graph showing temperature overshoots at the points b, c, and e. Now the predetermined temperature is assumed to $T_S$. When the heater 18 is energized, the temperature of the vessel is increased. The temperature of the point b positioned near the heater 18 is increased in the most abrupt manner as shown by a curve b. Correspondingly, the temperature at the point c shown by a curve c is increased in a manner less steep than that at the point b but more abruptly than that at the point e expressed by a curve e. In FIG. 5, when the temperature at the point c reaches the predetermined temperature $T_S$ at an instant $t_S$, the temperature at the point b overshoots substantially, but that at the point e has not yet arrived at the predetermined temperature. When the temperature at the point c reaches the predetermined temperature $T_S$, the power supply to the heater 18 is shut down or decreased, and thus the temperature at point c begins to decrease. The temperature at the point e reaches the lower limit of a permitted error range $T_S \pm \Delta T_S$ at an instant $t_4$ and continues to gradually increase, but does not exceed the upper limit of the permitted error range. In this manner, it is possible to limit the temperature overshoot of the sample solution contained in the flowcell to keep it within the permitted error range and to accurately heat the flowcell to the desired predetermined temperature within a short time period.

Figure 6:
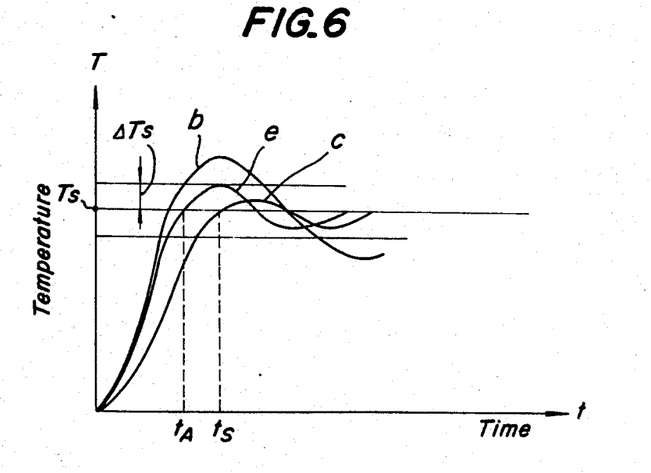

According to the invention, it is also possible to make the thermal time constant of the heat delaying plate 19 smaller than the flowcell 12 filled with the sample solution. In this case, temperature overshoots at the points b, c, and e appear as shown in FIG. 6. The rate of temperature increase at the point e becomes higher than at the point c, and thus the temperature at the point e is increased in a faster manner than the previous embodiment, so that it reaches the predetermined temperature $T_S$ at an instant $t_4$. In this manner, it is possible to increase quickly the temperature of the sample solution to the desired temperature. After that, when the temperature of the point c reaches the predetermined temperature $T_S$ at an instant $t_S$, the heater 18 is de-energized and the temperature at the point c begins to decrease. Then, if the instances $t_4$ and $t_S$ are suitably set and each portion is so constructed that the temperature at the point e at the instant $t_S$ lies within the permitted error range $T_S \pm \Delta T_S$, it is possible to remove the temperature overshoot and also to improve the response characteristics of the system.

Figure 7:
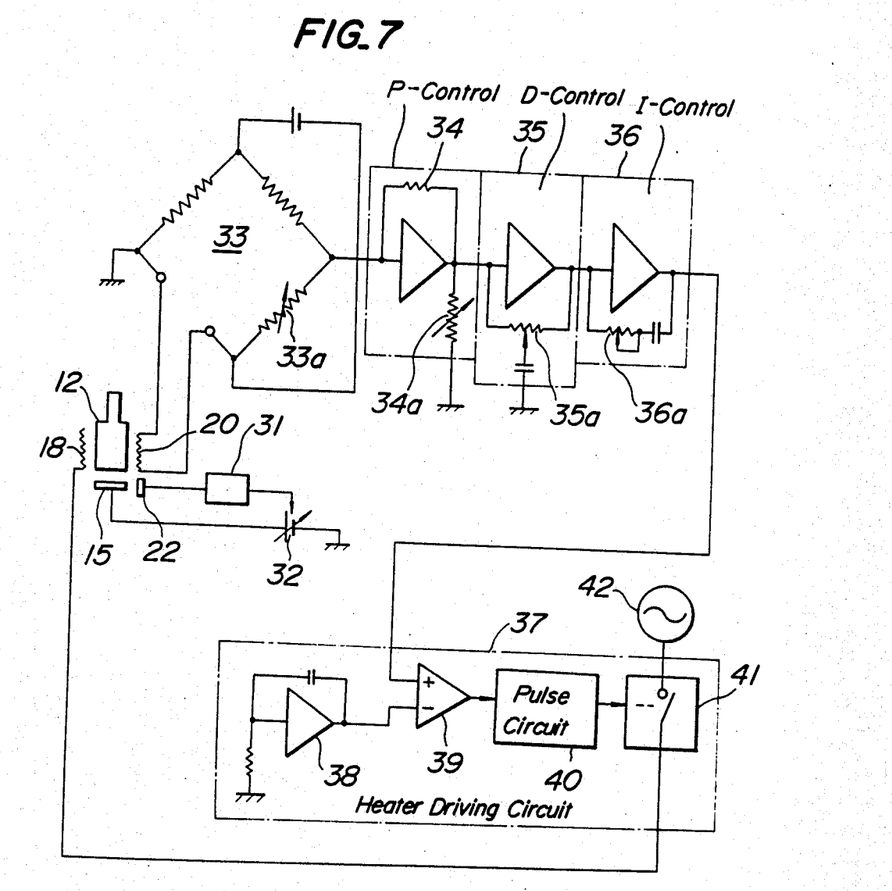
FIG. 7 is a circuit diagram showing one embodiment of a heater controlling circuit according to the invention.

FIG. 7 is a circuit diagram showing one embodiment of a heater control circuit for controlling a power supply to the heater 18 in accorance with an output of the temperature sensor 20. An output signal of the auxiliary temperature sensor 22 which is secured to the isothermal frame 13 as shown in FIG. 2 is supplied to a Peltier element control circuit 31 to control an output voltage of a power supply 32 connected to the Peltier element 15, and thus the isothermal frame 13 is always maintained at the given low temperature. In the embodiment according to the invention, since the Peltier element 15 is used only as the cooling means, the power supply 32 can be constructed with a D.C. power supply having a mono-polarity. The temperature sensor 20 arranged in the isothermal frame 13 is connected to one side of a D.C. bridge 33, and an output signal of the bridge 33 represents a difference between the temperature of the sample solution and the predetermined temperature. The output signal of the bridge is supplied to a proportional control circuit 34. The proportional control circuit 34 functions to control the heat amount emitted from the heater 18 in proportion to the difference between the predetermined temperature and the temperature of the flowcell. The gain of the proportional control can be changed by adjusting a variable resistor 34a. Then, an output signal of the proportional control circuit 34 is supplied to a differential control circuit 35. The differential control circuit 35 is not actuated if the temperature of the flowcell is not varied, but, when the temperature of the flowcell varies abruptly, the circuit 35 functions to control the heat amount emitted from the heater 18 corresponding to such variation. The control characteristics of the differential control circuit can be adjusted by a variable resistor 35a. Then, an output signal of the differential control circuit 35 is supplied to an integral control circuit 36. The integral control circuit 36 functions to reduce an off-set represented by any steady-state deviation between the predetermined temperature and the temperature of the flowcell. The response characteristic of the integral control circuit can be changed by a variable resistor 36a. In this manner, the output signal passing through the proportional control circuit 34, the differential control circuit 35, and the integral control circuit 36 is further supplied to a heater driving circuit 37. The heater driving circuit 37 comprises a saw-tooth wave generator 38, a differential amplifier 39 for deriving a difference between the outputs of the saw-tooth wave generator 38 and the integral control circuit 36, a switching pulse generating circuit 40 for generating a switching pulse from an output of the differential amplifier 39, and a switch 41 such as an SCR whose on and off state is controlled by the switching pulse. As for the switch 41, use is made of bilateral switch in which two SCRs are connected in parallel with each other in opposite polarities, and the switch 41 is arranged between a commercial power supply 42 and the heater 18.

Figure 8A:
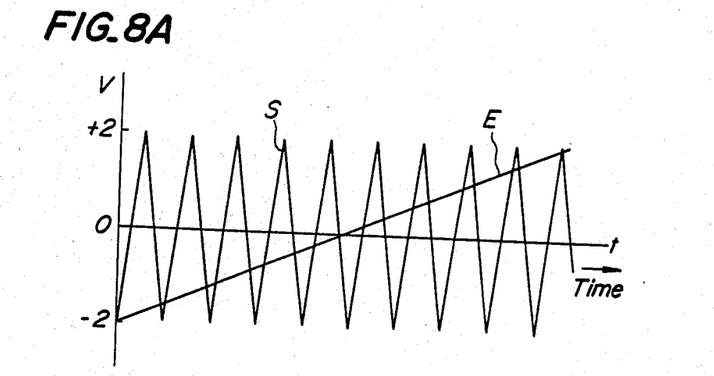
FIGS. 8A and 8B are waveforms for explaining an operation of the circuit shown in FIG. 7.
Figure 8B:
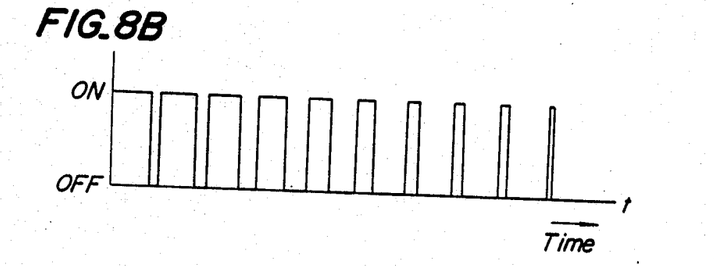

The operation of the heater driving circuit 37 will be explained with reference to FIGS. 8A and 8B. FIG. 8A shows the output voltage E from the integral control circuit 36, and a saw-tooth wave voltage S generated from the saw-tooth wave generator 38. Voltages E and S are compared with each other by means of the differential amplifier 39, and, as shown in FIG. 8B, switching pulses each having a pulse width corresponding to a level difference between voltages E and S are generated by the switching pulse generating circuit 40. The switch 41 is made ON by the switching pulse to supply power to the heater 18. In this manner, the power supply to the heater 18 can be controlled in accordance with the difference between the predetermined temperature and the temperature detected by the temperature sensor 20, and thus the sample solution contained in the flowcell can be maintained at the predetermined temperature in a prompt and precise manner.

Figure 9:
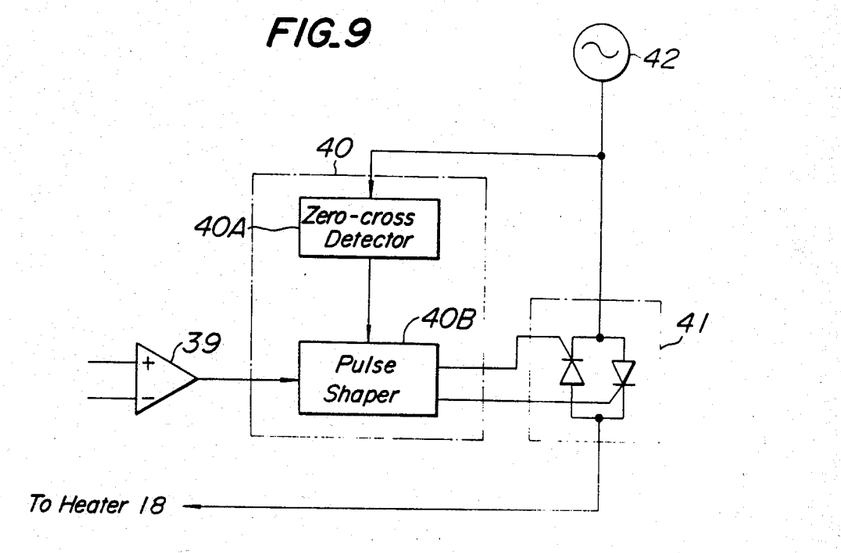
FIG. 9 is a block diagram illustrating one embodiment of a switching pulse generating circuit according to the invention.
Figure 10A:
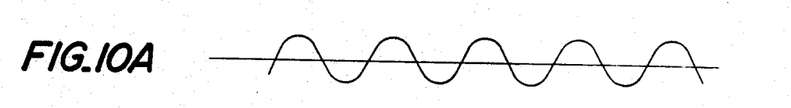
FIGS. 10A to 10D are waveforms for explaining an operation of the circuit shown in FIG. 9.
Figure 10B:
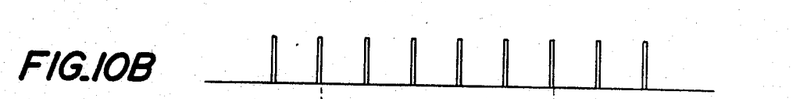
Figure 10C:
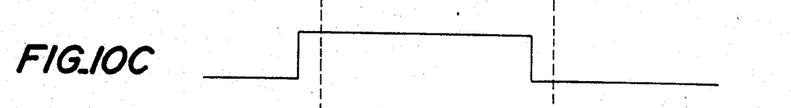
Figure 10D:
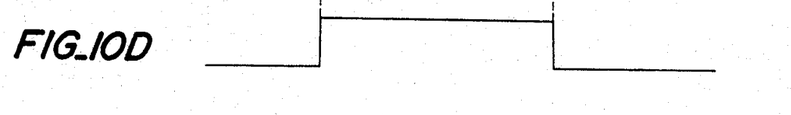

If the output signal of the differential amplifier 39 is not synchronized with the voltage from the A.C. power supply 42, the voltage of the power supply is not always made zero at ON and OFF operation of the switch 41. In this case, there occurs so-called switching bounds which cause noise in a computer, etc., so that the whole chemical analyzer is liable to provide an erroneous result. In order to eliminate such a drawback, the switching pulse generator 40 may comprise a zero-cross detection circuit 40A and a pulse shaping circuit 40B as shown in FIG. 9. In the switching pulse generator 40, the zero-cross detecting circuit 40A functions to detect the zero-cross points of the power supply illustrated in FIG. 10A and to generate pulses at the detected zero-cross points as shown in FIG. 10B. Then, the pulses are supplied to the pulse shaping circuit 40B. When a pulse whose leading and trailing edges are not synchronized with the A.C. power supply voltage as shown in FIG. 10C is supplied from the differential amplifier 39 to the pulse shaping circuit 40B, the circuit generates a pulse which is synchronized with the zero-cross pulses as shown in FIG. 10D. Since the SCRs of the switch 41 are controlled by means of this pulse to switch on and off the power supply at given instants when the voltage of the power supply is zero, the noise mentioned above does not occur in the apparatus.

As mentioned above, the power supply to the heater 18 is controlled by ON, OFF operations of the commercial power supply by means of the switch 41, but the duty cycle of the switching pulse which functions to trigger the switch 41 is varied in proportion to the output voltage E of the integral control circuit 36. For example, if it is assumed that the output voltage E is varied within the range from $-2$ V to $+2$ V in response to a difference between the detected temperature and a predetermined temperature, the switching pulse having a 50% duty cycle is obtained when the output voltage E is 0 V. The apparatus is so constructed that the temperature in the flowcell is maintained at about the predetermined temperature under such a condition. Now, if it is assumed that the cycle of the saw-tooth wave voltage S is 0.1 seconds, the switch 14 is made ON and OFF every 0.05 seconds and thus the commercial powe supply is cut off every five half cycles. The nearer the output voltage E becomes to $-2$ V, the longer the duty cycle becomes, and thus the heater 18 is made ON over five half cycles. In the case of E= $-2$ V, the switch 41 is always made ON, and thus the power supply voltage is fully applied to the heater 18. If the heater driving circuit 37 is constructed in this manner, it is easy to change the predetermined temperature by varying the temperature at which the output voltage E becomes 0 V by suitably adjusting a variable resistor 33a of the bridge 33.

Figure 11:
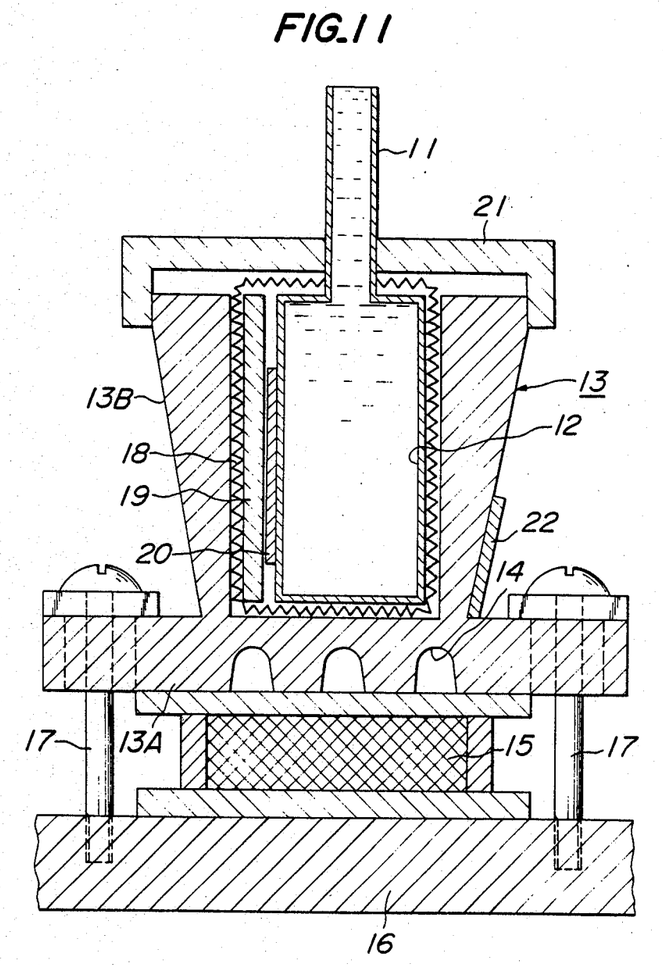
FIGS. 11 to 14 are cross sectional views respectively showing several embodiments of a vessel according to the invention.

The present invention is not limited to the embodiments mentioned above, various modifications being possible. For example, it is possible to make the thickness of the side wall of the isothermal frame 13 gradually thicker corresponding to a distance from the Peltier element 15, as shown in FIG. 11. With such a construction, it is possible to make the temperatures at various portions of the isothermal frame 13 effectively equal to each other.

Figure 12:
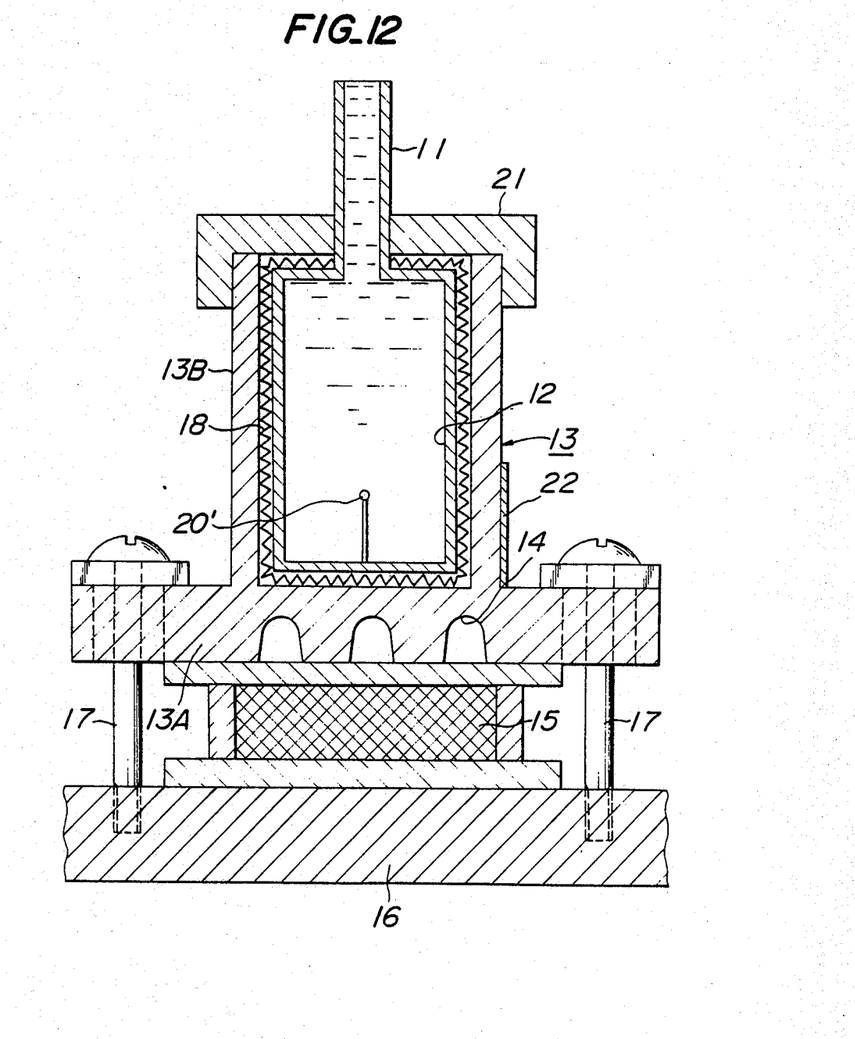

Moreover, in the embodiments illustrated in FIGS. 2 and 11, the temperature sensor 20 is arranged outside the flowcell 12 and the heat delaying plate 19 is inserted between the temperature sensor 20 and the heater 18. In the embodiment shown in FIG. 12, the heater 18 is arranged directly outside the flowcell 12 and a temperature sensor 20' is provided in the flowcell. In this embodiment, it is a matter of course that no heat delaying plate is necessary, but problems may arise as the possibility of contamination between successive sample solutions might increase and the durability of the temperature sensor might be shortened. Therefore, it is preferable to arrange the temperature sensor outside the flowcell.

Figure 13:
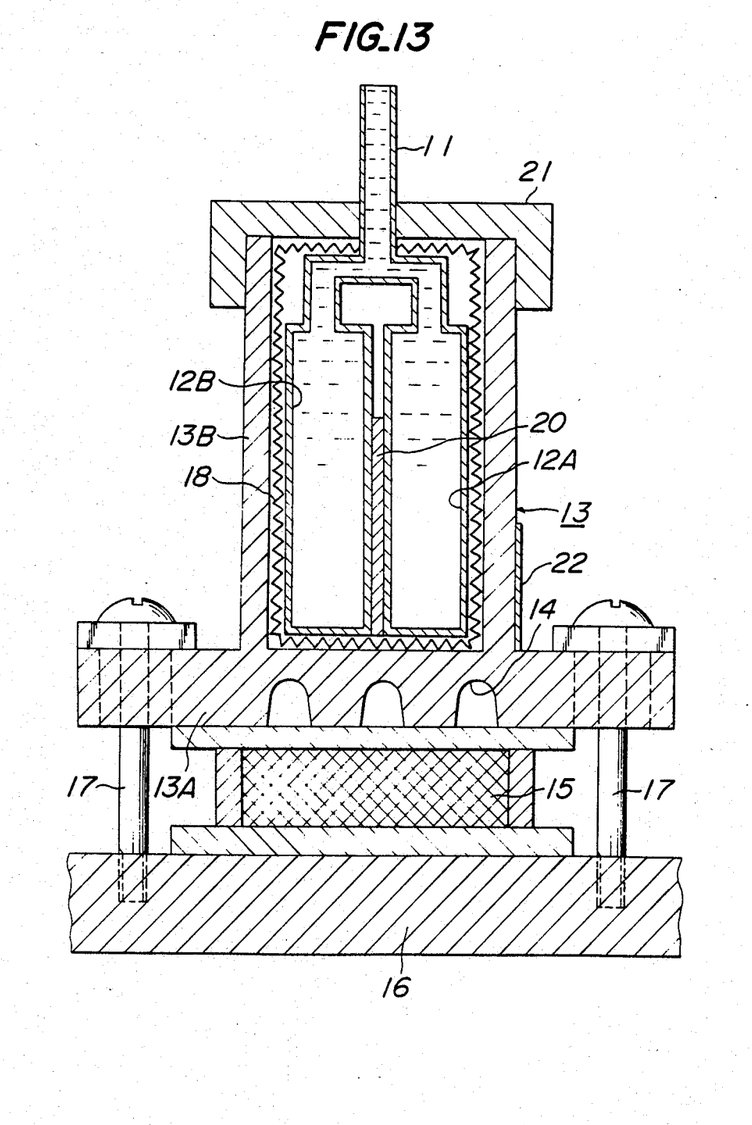
Figure 14:
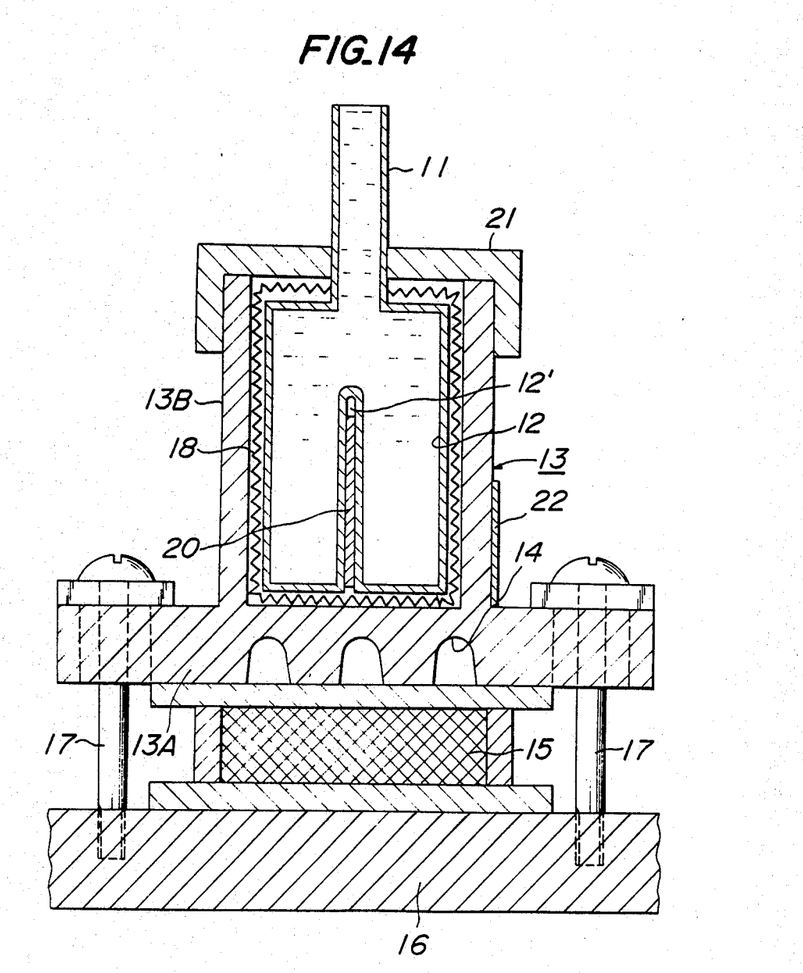

In another embodiment according to the invention, it is possible to arrange the temperature sensor 20 outside the flowcell but still omit the heat delaying plate. FIGS. 13 and 14 show such embodiments. In the embodiment shown in FIG. 13, the flowcell is divided into two flowcell halves 12A, 12B which are arranged in a space surrounded by the heater 18, and the temperature sensor 20 of a thin film type is inserted between two flowcell halves. The sample solution is supplied equally to the two flowcell halves through the tube 11. In this case, the photometry can be performed through only one flowcell, but it is possible to improve the reliability of the photometry by effecting photometry through both flowcell halves. In the embodiment shown in FIG. 14, a thin, flat space 12' is formed in the bottom surface of the flowcell 12, and the thin film temperature sensor 20 is inserted into this space 12'.

Moreover, in the embodiments mentioned above, use is made of the Peltier element as the cooling means, but it is possible to use any other cooling means. In addition, it is a matter of course that some other heater than a wire heater can be used as the heating means. Further, when the surrounding temperature of the vessel does not vary much, it is not necessary to control the cooling means, and thus the auxiliary temperature sensor 22 can be omitted.

As mentioned above according to the invention, since use is made of both heating and cooling means, it is possible to maintain the temperature of the sample solution at the desired predetermined temperature accurately, and more accurate analysis can be performed. The apparatus is so constructed that, while maintaining the temperature of the cooling means at lower than the predetermined temperature, the heating means is controlled in response to the detection output of the temperature sensor, and it is possible to control the temperature of the flowcell in a quick and highly accurate manner against an abrupt temperature variation.

While the invention has been described in connection with various physical embodiments, the scope of the invention is not limited thereby and is defined by the claims set forth below. Various modifications to the embodiments described above would be obvious to one of ordinary skill in the art without altering the spirit or scope of the present invention as set forth in the claims below.

What is claimed is:

1. A vessel for containing a liquid to be chemically analyzed and for maintaining the liquid at a predetermined temperature comprising:

means for containing a liquid;

heating means substantially fully surrounding said containing means for heating the liquid;

an isothermal frame surrounding said heating means and having a large heat capacity, said isothermal frame comprising a bottom, side walls integrally formed with the bottom, the sidewalls increasing in thickness from the bottom to upper portions thereof, and a cover detachably provided on the upper portions of the side walls;

a cooling source comprising a Peltier element connected to an outer surface of the bottom of said isothermal frame; and means for detecting a temperature of the liquid.

2. A vessel according to claim 1, wherein an outer surface of a the Peltier element is connected to a radiator member and the isothermal frame is coupled with the radiator member by means of screws made of heat insulating material.

3. A vessel according to claim 1, wherein said temperature detecting means is arranged in the containing means.

4. A vessel according to claim 1, wherein said containing means comprises two container halves which are arranged side by side with a narrow space interposed therebetween, said temperature detecting means being arranged in said space.

5. A vessel according to claim 1, wherein said containing means comprises a container having a narrow space formed therein and extending inwardly thereinto, said temperature detecting means being arranged in said space.

6. A vessel according to claim 1, further comprising an auxiliary temperature detecting means for sensing a temperature of said cooling means.

7. A vessel according to claim 1, wherein said temperature detecting means comprises a temperature sensor of thin plate type.

8. A vessel according to claim 1, further comprising a heat resistance member having a lower thermal conductivity than said isothermal frame and interconnecting said Peltier element and said isothermal frame.

9. A vessel according to claim 8, wherein said heat resistance member comprises recesses formed in said outer surface of said isothermal frame.

10. A vessel according to claim 9, wherein said recesses are filled with material having a lower thermal conductivity than said thermal frame.

11. A vessel for containing a liquid to be chemically analyzed and for maintaining the liquid at a predetermined temperature comprising:
means for containing a liquid;
heating means substantially fully surrounding said containing means for heating the liquid;
heat delaying means arranged between the containing means and the heating means for delaying heat transfer therebetween; and
temperature detecting means arranged between the containing means and the heat delaying means for detecting a temperature;
said heat delaying means having a thermal time constant such that the temperature detected by said temperature detecting means is substantially equivalent to that at the center of said liquid containing means.

12. A vessel according to claim 11, wherein said heat delaying means has a thermal time constant which is substantially equal to that of the containing means filled with the liquid.

13. A vessel according to claim 11, wherein said heat delaying means has a thermal time constant which is somewhat larger than that of the containing means filled with the liquid.

14. A vessel according to claim 11, wherein said heat delaying means has a thermal time constant which is somewhat smaller than that of the containing means filled with the liquid.

15. A vessel for containing a liquid to be chemically analyzed and for maintaining the liquid at a predetermined temperature comprising:
means for containing the liquid;
heating means substantially fully surrounding the containing means for heating the liquid;
an isothermal frame surrounding said heating means and having a large heat capacity;
a cooling source arranged on an outer surface of said isothermal frame;
heat delaying means arranged between the containing means and the heating means for delaying heat transfer therebetween; and
temperature detecting means arranged between the containing means and the heat delaying means for detecting a temperature;
said heat delaying means having a thermal time constant such that the temperature detected by said temperature detecting means is substantially equivalent to that at the center of the liquid containing means.

16. A vessel according to claim 15, wherein said cooling source comprises a Peltier element which is provided on an outer surface of the isothermal frame.

17. A vessel according to claim 16, further comprising a heat resistance member having a lower thermal conductivity than said isothermal frame and interconnecting said Peltier element and said isothermal frame.

18. A vessel according to claim 17, wherein said heat resistance member comprises recesses formed in said outer surface of said isothermal frame.

19. A vessel according to claim 18, wherein said recesses are filled with material having a lower thermal conductivity than said isothermal frame.

20. A vessel according to claim 16, wherein an outer surface of the Peltier element is connected to a radiator member and the isothermal frame is coupled with the radiator member by means of screws made of a heat insulating material.

21. A vessel according to claim 16, wherein said isothermal frame comprises a bottom to which the Peltier element is connected, side walls integrally formed with the bottom and a cover detachably provided on upper portions of the side walls.

22. A vessel according to claim 21, wherein said side walls increase in thickness from the bottom to the top thereof.

23. A vessel according to claim 15, wherein said heat delaying means has a thermal time constant which is substantially equal to that of the containing means filled with the liquid.

24. A vessel according to claim 15, wherein said heat delaying means has a thermal time constant which is somewhat larger than that of the containing means filled with the liquid.

25. A vessel according to claim 15, wherein said heat delaying means has a thermal time constant which is somewhat smaller than that of the containing means filled with the liquid.

26. A vessel according to claim 15, wherein said temperature detecting means comprises a temperature sensor of a thin plate type.

* * * * *